(12) United States Patent
Bruhn et al.

(10) Patent No.: US 8,847,538 B2
(45) Date of Patent: Sep. 30, 2014

(54) RIPPLE COUNTER FOR MULTI-POLE MOTORS

(71) Applicant: Nidec Motors & Actuators (Germany) GmbH, Bietigheim-Bissingen (DE)

(72) Inventors: Rainer Bruhn, Bietigheim-Bissingen (DE); Thomas Voegerl, Bietigheim-Bissingen (DE); Andrè Ebel, Bietigheim-Bissingen (DE); Che sakre Bin Shamsol, Bietigheim-Bissingen (DE)

(73) Assignee: Nidec Motors & Actuators (Germany) GmbH, Bietigheim-Bissingen (DE)

( * ) Notice: Subject to any disclaimer, the term of this patent is extended or adjusted under 35 U.S.C. 154(b) by 83 days.

(21) Appl. No.: 13/655,765

(22) Filed: Oct. 19, 2012

(65) Prior Publication Data

US 2013/0099718 A1 Apr. 25, 2013

(30) Foreign Application Priority Data

Oct. 21, 2011 (DE) .......................... 10 2011 116 652

(51) Int. Cl.
*G05B 19/21* (2006.01)
*H02K 23/66* (2006.01)

(52) U.S. Cl.
CPC ...................................... *H02K 23/66* (2013.01)
USPC ............................ 318/603; 318/600; 318/560

(58) Field of Classification Search
CPC ................................ H02K 23/66; H02K 23/04
USPC .............. 318/603, 600, 560; 310/248, 154.21
See application file for complete search history.

(56) References Cited

U.S. PATENT DOCUMENTS

| 6,104,110 A | 8/2000 | Uchida et al. |
| 7,239,063 B2 * | 7/2007 | Yamamoto et al. ........... 310/239 |
| 2008/0001492 A1 | 1/2008 | Cros et al. |
| 2008/0093947 A1 | 4/2008 | Aoyama et al. |
| 2010/0270886 A1 | 10/2010 | Uenishi et al. |
| 2011/0198954 A1 | 8/2011 | Saito et al. |

FOREIGN PATENT DOCUMENTS

| DE | 10 2008 021 071 A1 | 11/2009 |
| EP | 1 316 136 B1 | 2/2006 |
| JP | 2000-060076 A | 2/2000 |
| JP | 2001-231219 A | 8/2001 |
| JP | 2002-084719 A | 3/2002 |
| JP | 2009-159674 A | 7/2009 |
| JP | 2009-303326 A | 12/2009 |
| JP | 2010-154729 A | 7/2010 |
| JP | 2011-103731 A | 5/2011 |
| WO | 2010/009705 A1 | 1/2010 |
| WO | 2010/058851 A1 | 5/2010 |

* cited by examiner

*Primary Examiner* — David Luo
(74) *Attorney, Agent, or Firm* — Keating & Bennett, LLP

(57) ABSTRACT

An electric motor includes at least one first brush and at least one second brush, which are arranged in a stationary fashion and arranged to contact a commutator that rotates with a rotor. The commutator includes at least one cylindrical section with a circumferential surface on which a plurality of segments are arranged with insulating sections interposed between them. In order to detect the rotating speed and position of the rotor, the motor includes brushes with asymmetric circumferential widths or angles or a stator with an uneven magnetization. The motor is arranged to detect only one signal when the rotor rotates for an angle between two adjacent segments.

25 Claims, 6 Drawing Sheets

RIPPLE COUNTER FOR MULTI-POLE MOTORS

BACKGROUND OF THE INVENTION

1. Field of the Invention

The present invention relates to an electric motor and a method for determining a position or rotation speed of a motor and more particularly to a motor and method in which brushes and a commutator of a motor detect a rotary motion and a position of a rotor.

2. Description of the Related Art

For many applications involving small electric motors, it is advantageous if, in addition to producing a rotary motion, an electric motor also can supply information about its current state or position. In order to accomplish this, it is known, for example, to use the excitation circuit of the electric motor as a "ripple counter" or as an asynchronous counter.

Such an electric motor is disclosed in, for example, EP 1 316 136. In this electric motor, two brushes are arranged to alternately contact six lamellae or segments of the commutator. In this case, the brushes in the commutator are arranged opposite to each other, i.e. are offset by 180°, so that the brushes are in contact with respective opposite segments of the commutator. During the rotary motion of the commutator, a periodic change takes place from one segment to the adjacent segment. During this time, each brush is in electrical contact with two segments simultaneously. The corresponding switching or commutation therefore occurs simultaneously in both brushes. Accordingly, there is always a total of either one segment or two segments in contact with each of the brushes. By detecting the current of the motor, the number of segments in contact with brushes can be speculated, and the rotating speed and position of the rotor is possible to be calculated. However, in order to increase the torque, a motor with four magnets is always used. And in this situation, the vibration and noises of the motor is big if the number of coils is an integral multiple of the number of brushes, and the numbers of segments in connection with both brushes change at the same time. The present invention therefore is based on the task of reducing the vibration and noises, with the generated current signal easy to be detected to determine the rotating speed and position of the motor.

SUMMARY OF THE INVENTION

Preferred embodiments of the present invention provide an electric motor that detects a rotating speed and a position of a rotor by using an easily-calculated signal of a current ripple of the electric motor, which is called a "ripple counter" method, without causing an increase in vibration or noises produced by the electric motor.

According to a preferred embodiment of the present invention, an electric motor includes at least one first brush and one second brush, which are arranged in a stationary manner relative to a commutator that rotates together with a rotor. In particular, the electric motor preferably includes four or more poles. The commutator preferably includes at least one cylindrical section with a circumferential surface on which a plurality of segments is arranged with insulating sections interposed between the plurality of segments. The first brush preferably has a first width which covers a first section of the circumferential surface and the second brush preferably has a second width which covers a second section of the circumferential surface; the first brush and the second brush are arranged to produce an asymmetrical contacting arrangement with the segments. To achieve the asymmetrical contacting arrangement, the first width of the first brush is preferably different from the second width of the second brush. Alternatively or in addition, the asymmetrical contacting arrangement can be achieved preferably by arranging the first brush and second brush irregularly around the rotation axis.

The asymmetrical contacting arrangement of the first brush and the second brush with segments makes it possible for a commutation of the first brush to be carried out asynchronously with the commutation of the second brush. As a result, a different number of segments are contacted with brushes at different rotation angles. Accordingly, when the rotor rotates, a chronological sequence of different-length times in which the first brush and the second brush are in contact with a different number of segments is created. This chronological sequence can be used as a ripple counter or as an asynchronous counter. The chronological sequence depends on the rotation speed of the rotor and the two must be understood in relation to each other.

In accordance with a preferred embodiment of the present invention, it is possible for the asymmetrical contacting arrangement and arrangement of the plurality of segments relative to the first brush and the second brush to include a situation in which a brush angle that the first brush defines together with the second brush is both greater than a first segment angle that is defined by two segments adjacent to each other and also less than a second segment angle that is defined by two segments which have another one of the segments arranged between them.

In accordance with a preferred embodiment of the present invention, it is also possible for the asymmetrical arrangement of the plurality of segments relative to the first brush and the second brush to be arranged such that a brush angle that the first brush defines with the second brush is not equal to a segment angle that is defined by each combination of two of the segments. In this case, at no time does a synchronous commutation of the first and second brushes occur.

In accordance with a preferred embodiment of the present invention, it is also possible for the asymmetrical arrangement of the plurality of segments relative to the first brush and the second brush to ensure that, at any time during a full rotation of the rotor, a total of either two/three, or three/four segments are in electrical contact with the first brush and the second brush. This arrangement is advantageous for the functioning of the asynchronous counter.

The first brush and the second brush can also have different widths. The term "width" referenced herein includes an arrangement in which the first brush includes a first circle segment serving as a contact surface and the second brush includes a second circle segment which also serves as a contact surface, the width of the second circle segment being different from the first circle segment. This also preferably yields a sequence of different rotation angles and corresponding relative contact times such as, for example: 3 contacts short, 4 contacts long, 3 contacts short, 4 contacts short, 3 contacts short, and the like.

In accordance with a preferred embodiment of the present invention, the plurality of segments can be of the same size or width and, in particular, can be arranged to cover an equal circle segment of the cylindrical section while being spaced equidistantly apart from one another. In this case, conventional commutator structures can be used with the preferred embodiments of the present invention and the asynchronous arrangement will be determined solely by the arrangement and design of the brushes.

In accordance with a preferred embodiment of the present invention, the plurality of segments can also be of different sizes. Alternatively or in addition, the plurality of segments can be irregularly spaced from one another. It is thus possible to achieve an asynchronous arrangement even with a predetermined arrangement of brushes.

In accordance with a preferred embodiment of the present invention, the first brush and the second brush can preferably be arranged at an angle of, for example, approximately 90° apart from one another around the commutator. Providing an asymmetrical arrangement of brushes and segments turns out to be particularly advantageous if the first brush and the second brush are spaced apart from each other by, for example, an angle of less than 90° and, in particular, preferably at an angle of approximately 86°, for example. The electric motor includes at least two brushes, but can also include additional brushes. In particular, the electric motor is preferably laid out in the form of a four-pole motor, for example. If more than two brushes are provided, these additional brushes can also be used for the asynchronous counter, but this is not required.

According to another preferred embodiment of the present invention, an electric motor includes at least one first brush and one second brush or brushes, which are arranged in a stationary fashion relative to a commutator that rotates together with a rotor. The commutator preferably includes at least one cylindrical section with a circumferential surface on which a plurality of segments are arranged, with insulating sections interposed between the plurality of segments. The plurality of segments in this case are preferably arranged asymmetrically relative to the first brush and second brush or brushes.

The asymmetrical contacting arrangement/arrangement can be achieved through differing widths of the brushes. The asymmetrical arrangement can also be achieved through an asymmetrical arrangement of the brushes around the commutator.

The first brush and the second brush may preferably have the same width, for example. In this case, the asynchronous arrangement is produced by setting the brush angle that the brushes define with each other relative to the segment angle.

In a preferred embodiment of the present invention, the first and second brushes are preferably in electrical contact with a total of three segments for a first time interval and are in electrical contact with a total of four segments for a second time interval; the first time interval and the second time interval are preferably different from each other and depend on the rotation speed of the rotor. The ratio of the duration of the first time interval to the duration of the second time interval is preferably constant independent of the rotation speed of the rotor while the absolute values of the duration of the first time interval to the duration of the second time interval are dependent on the rotation speed of the rotor. In other words, the first time interval corresponds to a first rotation angle of the rotor and the second time interval corresponds to a second rotation angle of the rotor that differs from the first rotation angle.

According to a further preferred embodiment of the present invention, an electric motor includes a rotor arranged on a rotation axis and a stator, wherein the stator has an asymmetrical magnetization or an asymmetrical magnetic field. The stator may preferably include at least one first magnet element and one second magnet element, which are arranged or distributed asymmetrically or irregularly with respect to one another around the rotating axis. Alternatively, or in addition, the stator can include asymmetrical magnet elements. As a result, the magnetic fields are distributed asymmetrically or irregularly around the rotation axis and certain commutation signals can be suppressed, which makes it easier to use the electric motor as an asynchronous counter. In this case, the brushes may preferably be arranged symmetrically around the rotation axis such that all of the brushes will have the same width. This arrangement can particularly be used in four-pole motors in which all of the brushes are preferably arranged at an angle of about 90° to one another around the rotation axis.

In accordance with various preferred embodiments of the present invention, the magnet elements can be permanent magnets or can include coils that are arranged as electromagnets. In particular, the magnet elements can also be arranged asymmetrically in order to produce an asymmetrical magnetic field.

According to yet another preferred embodiment of the present invention, a method for producing a sequence of natural numbers and for determining a position or a rotary motion of an electric motor by a measurement of the sequence and/or duration of a number of segments with which the first brush and the second brush are in electrical contact is preferably provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
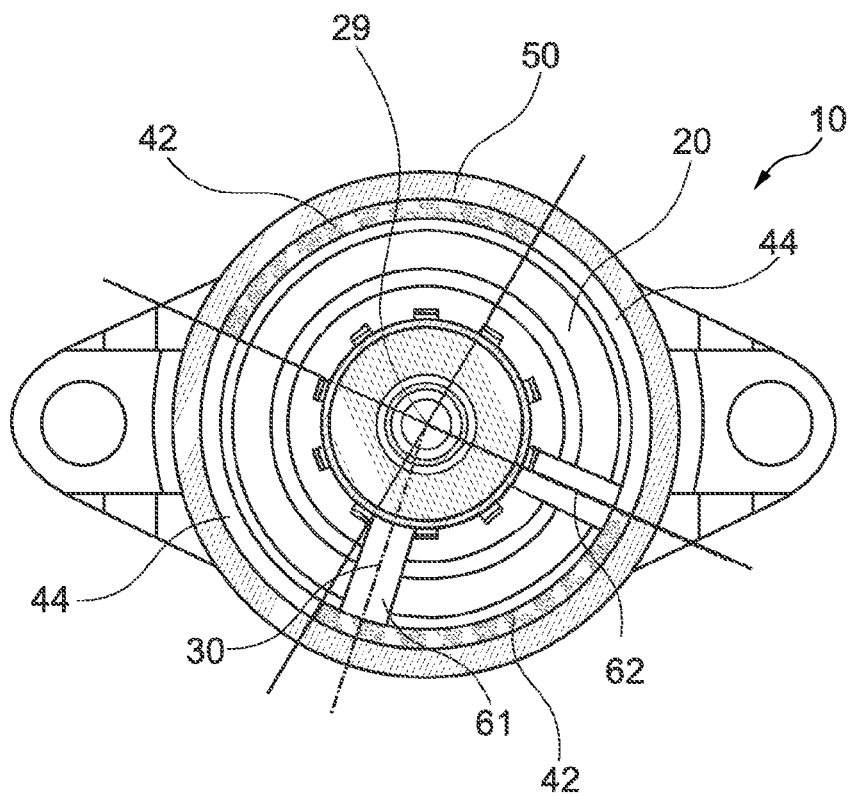
FIG. 1 shows a top view of an electric motor in accordance with a preferred embodiment of the present invention.

FIG. 1 shows a top view of an example of an electric motor 10 according to an embodiment of the present invention along a shaft 29. To better depict the brushes and the commutator, a front protective cap or anything in front of them provided in the motor 10 has been omitted in FIG. 1. The rotor, which includes an armature with a plurality of armature windings, is accommodated in a cylindrical housing 50. For the sake of better visibility, the armature and the armature windings which are situated behind an armature cover 20, are not shown in FIG. 1. The armature and the corresponding armature windings correspond in number and type to standard armatures. The armature is preferably arranged to rotate radially inward from permanent magnets 42, 44. The permanent magnets 42, 44 preferably include two north pole magnets 42 and two south pole magnets 44 which are respectively arranged opposite to each other. It is also possible, however, to use any other desirable arrangements of permanent magnets, electromagnets, etc. and any other desirable number of armature elements and windings.

In the present embodiment of the present invention, the shaft 29 preferably includes a commutator 30 arranged on it. The commutator 30 includes a plurality of segments (i.e., lamellae) 32a to 32j made of an electrically conductive material. The segments 32a to 32j are situated on the circumferential surface of the commutator 30 so that the surfaces of segments 32a to 32j define the surface of the commutator 30. In this preferred embodiment, the commutator 30 preferably includes ten segments 32a to 32j, for example, which are spaced equidistantly apart from one another on the outer circumferential surface of the commutator 30. However, any other desirable number of segments could be used. The segments 32a to 32j are preferably separated from one another by respective insulating slots, such as, for example, insulating slot 33f and are thus separated from one another electrically.

Furthermore, at least one first brush 61 and one second brush 62 are arranged so that they are in electrical contact with the segments of the commutator 30. The brushes 61 and 62 are preferably made of, for example, carbon, or any other electrically conductive material. To accomplish the electrical contact, the brushes 61 and 62 are pressed inward in the radial direction preferably with, for example, a spring. Since the sides of the brushes 61 and 62 facing the segments cover a larger circle segment of the commutator 30 than widths of the insulating slots, such as insulating slot 33j, the brushes 61 and 62 are each in electrical contact with at least one of the segments 32a to 32j during particular angles of rotation and in contact with two of the segments 32a to 32j during other particular angles of rotation.

As shown in FIG. 1, in one embodiment of the present application, the brushes are preferably arranged at an angle of less than approximately 90°, such as, for example, about 86° or about 81°. However, it is also possible for the brushes to be positioned at an angle of more than about 90°, like, for example, about 94° or about 99°.

Figure 2:
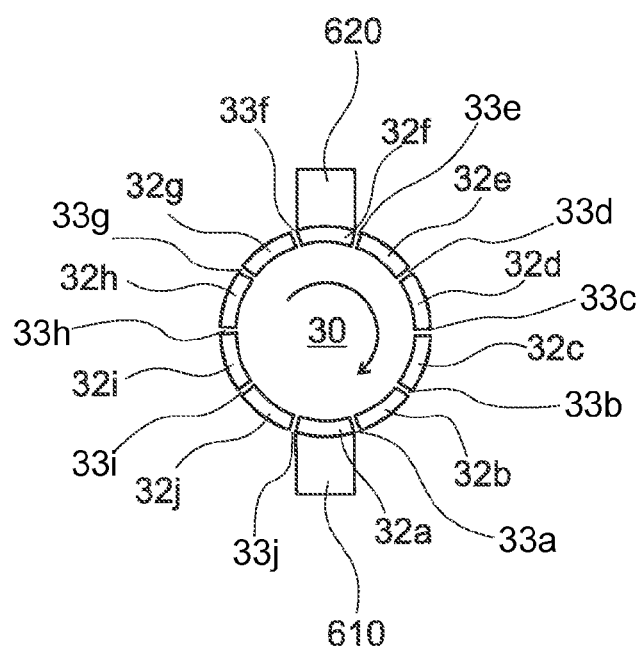
FIG. 2 shows the arrangement of two brushes and the corresponding segments of a commutator in accordance with a preferred embodiment of the present invention.

By contrast with this and for better comprehension, FIG. 2 schematically depicts an arrangement of two brushes 610 and 620 and the commutator 30 of a bipolar motor. The first brush 610 and the second brush 620 in this case are offset from each other by 180°, i.e., are positioned opposite each other over the commutator 30. With an even number of segments 32a to 32j arranged uniformly on the commutator 30, the commutation of a segment to the adjacent segment then occurs synchronously on both sides, i.e., with the first brush 610 and second brush 620, respectively. In other words, in the example shown in FIG. 2, the first brush 610 is in electrical contact with the segment 32a while the second brush 620 is in electrical contact with the opposite segment 32f. If the rotor and therefore the commutator 30 then rotate, for example, clockwise, the commutation of the first brush 610 at the segment 32a travels to the segment 32b at the same time as the commutation of the second brush 620 at the segment 32f travels to the segment 32g. The commutation in this case will yield a switching sequence in which the brushes 610 and 620 together contact two segments for a relatively short interval followed by contact with four segments for a relatively long interval. The expressions "relatively short" and "relatively long" relate to each other here and with regard to their absolute values, are clearly dependent on the rotation speed of the electric motor. The ratio of short to long contact times is determined by the ratio of the width of the brushes 610 and 620 to the width of the segments 32a to 32j and should be selected so that the different-length contact times can be reliably detected.

If instead of the above-described bipolar motor with two brushes 610 and 620, a four-pole motor with a total of two or four brushes is used, then the brushes are usually arranged at an angle of 90° to one another. In such a symmetrical arrangement with, for example, a 12-part commutator and a pole angle of 90° between the brushes, a signal is easy to produce. The switching sequence is then symmetrical in commutation at both brushes and there are always a total of two or four segments simultaneously in contact with the brushes. The change from two to four contacts is accompanied by relatively big noises. Also, in a motor with a total of four brushes and 12 segments, the noise problem exists for the same reason.

Figure 3:
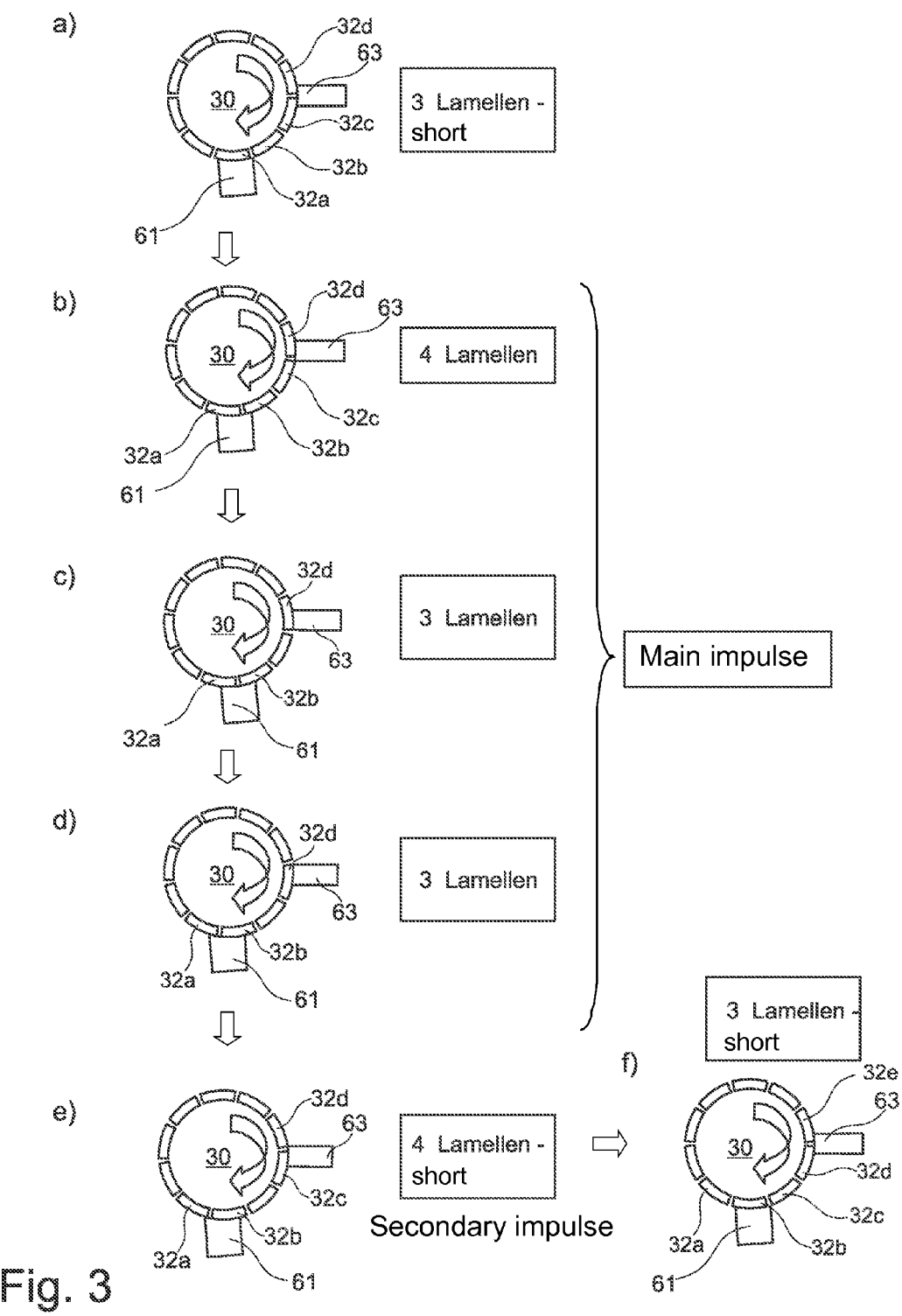
FIG. 3 shows an arrangement of various rotation positions (a)-(f) of a commutator according to a first preferred embodiment of the present invention.

A 10-part (as seen in FIG. 3) or 14-part commutator 30 correspondingly provided with 10 or 14 segments has a better acoustic commutation performance and produces less disadvantageous noise and vibration in a four-pole motor because the angle between two poles is not an integral multiple of the angle between two adjacent teeth. The change between segments/lamella occurs as follows: two brushes together contact with 3 lamellae—>4 lamellae—>3 lamellae—>4 lamellae or 2 lamellae—>3 lamellae—>2 lamellae—>3 lamellae. As a result, there are always two signals or lamella changes. These changes result in a resistance change of coils and the current will change accordingly. Thus, two signals, or two peaks, are produced in a current ripple curve when the motor rotates at an angle equal to the angle between two segments. For example, the angle is about 36° when the number of segments is 10, and about 26° (180/7 exactly) when the number of segments is 14. In order to detect only one signal, or to make only one signal detectable when the motor rotates, it is preferable to either produce the two peaks such that they will have different amplitudes or produce one of the two peaks such that it has almost twice as large a width of the original peaks by producing two peaks near each other.

The peaks having different amplitudes with each other or close to each other may be preferably generated by an uneven magnetization of the stator, or by asymmetric arrangement of the brushes or segments. The asymmetric arrangement of brushes may preferably be achieved by different circumferential widths of the brushes and/or by asymmetric placement around the commutator, which means changing the angle between brushes, or by unequally sized brushes or uneven arrangement of segments. And an uneven magnetization can be preferably achieved by, for example, magnets arranged asymmetrically or at least partially shaped asymmetrically.

FIG. 3 shows an example of brush arrangement according to a preferred embodiment of the present invention. In this case, the first brush 61 and the second brush 63 are preferably arranged at an angle of approximately 86° to each other. The stator of the motor may preferably include a plurality of magnets, the number of which is preferably 4, for example. When the motor includes four poles, the motor may preferably include four brushes, the number of which is the same as the number of poles. However, it is also possible to include two brushes as illustrated in FIG. 3, for example. The commutator 30 preferably includes ten segments 32a to 32j, for example.

The circumferential widths of the two brushes 61 and 63 are preferably different in FIG. 3. The circumferential width of the first brush 61 is preferably almost the same as the circumferential width of one segment or one segment plus one gap between the segments adjacent to each other. And the second brush 63 may preferably have a circumferential width of about half of the circumferential width of one segment plus one gap between the segments adjacent to each other. The brushes may have different circumferential widths, but the brushes preferably have circumferential widths the ratio of which is about 0.56, for example. This arrangement makes each duration of 3 lamellae—>4 lamellae—>3 lamellae—>4 lamellae different, which thereby leads to either the different amplitudes of the two peaks of the current ripple or the two peaks close to each other being generated when the motor rotates an angle equal to the angle between two segments. Because the amplitudes of the respective peaks are different or because the two peaks are close to each other, it is possible to detect only one of the two peaks such that this peak can be counted to calculate the rotating speed and position of motor. It is preferable that the method of joining two peaks into one peak is used because the peaks will have a bigger width such that the signal will be stronger and easier to detect when using this method, and because only one peak will be detected when the motor rotates an angle equal to the angle between two segments, which makes a reasonable frequency of peaks to be easy detected by a present equipment. In this case, there are preferably always a total of three or four of the segments 32a to 32j in contact with the first brush 61 and the second brush 63. In the starting position shown in (a) of FIG. 3, for example, the first brush 61 is in contact with only the segment 32a while the second brush 63 is in contact with both the segment 32c and the segment 32d. The first brush 65 and the second brush 63 are thus in contact with a total of three segments. With a clockwise rotation of the commutator 30, however, this situation only lasts for a movement of approximately one slot width 33a. Then, the segment 32b will also come into contact with the first brush 61 so that now, both the segment 32a and the segment 32b are in contact with the first brush 61 while the segment 32c and the segment 32d are both still in contact with the second brush 63, as shown in (b) of FIG. 3. Accordingly, at this time there are a total of four segments in electrical contact with the first brush 61 and second brush 63. If the commutator 30 rotates a short distance further, as shown in (c) of FIG. 3, the first brush 61 continues to remain in contact with the segments 32a and 32b while the second brush 63 is then only in contact with a segment 32d. This occurs due to the significantly smaller width of the second brush relative to the segments 32a to 32j. Consequently, there are once again only three segments 32a, 32b, and 32d in contact with the first brush 61 and second brush 63. And nothing about the overall situation changes when the commutator 30 rotates further in a clockwise direction, as shown in (d) of FIG. 3. In this case, the contact with the three segments lasts for a relatively long interval, i.e. for a larger rotation angle. After a further rotation, as shown in (e) of FIG. 3, the next segment 32d also comes into contact with the second brush 63 in addition to the segment 32c. At this time, the two segments 32a and 32b are still in contact with the first brush 61 so that once again, the first brush 61 and second brush 63 contact four segments for a short time interval or a small rotation angle, namely until the segment 32a is no longer in contact with the first brush 61. This then produces, as shown in (f) of FIG. 3, the same position as shown in (a) of FIG. 3, except that the commutator 30 has rotated clockwise by one segment, and the commutation will once again begin in the depicted rhythm of three contacts short, four contacts long, three contacts long, four contacts short. The sequence of short and long contact times or switching changes here are "long" and "short" relative to one another. The absolute duration of the short and long contact times naturally depends on the rotation speed of the rotor. With a total of 10 segments 32a to 32j, the a "short" rotation corresponds approximately to a rotation angle of 7.2°, while a "long" rotation can correspond to approximately double that amount. Each of positions (a)-(e) in FIG. 3 therefore correspond to a rotation angle difference of approximately 7.2°.

The arrangement shown in FIG. 3 preferably produces a current ripple signal that can be detected in a particularly advantageous and very precise way. In addition, a large amplitude can be achieved with the arrangement shown in FIG. 3 such that the asynchronous counter will preferably function very reliably even at rotation low speeds. According to a sequence shown in FIG. 3, the rotor has only rotated by a tenth of a revolution, which is 36° if 10 of the segments 32a to 32j are used.

Figure 4:
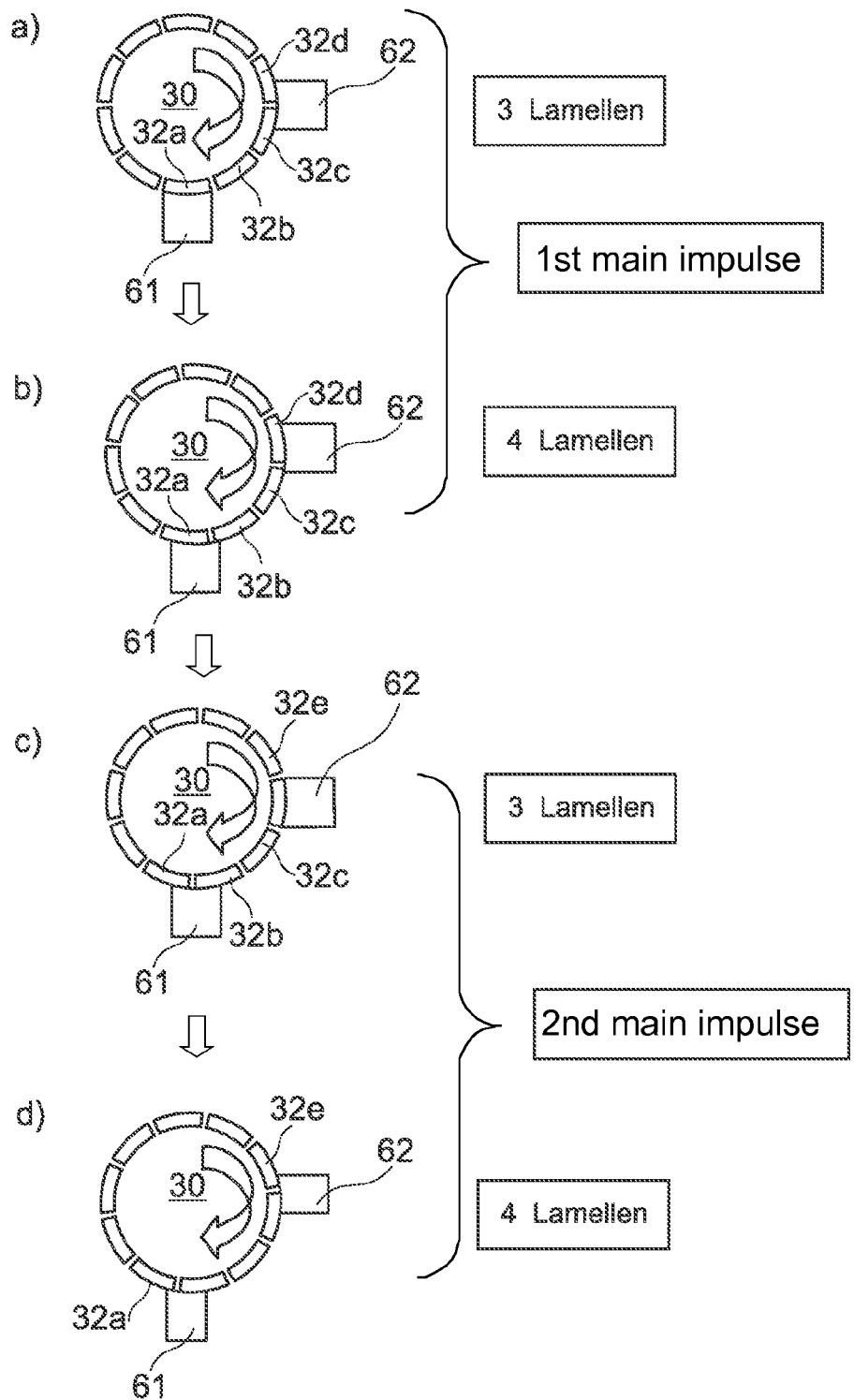
FIG. 4 shows another preferred embodiment of an arrangement of the commutator and the brushes in various positions (a)-(d) according to the present invention.

FIG. 4 shows an alternative preferred embodiment of the present invention in which, instead of using brushes 61, 63 of different widths, two brushes of the same width 61, 62 are arranged at a right angle to one another with respect to the commutator 30. The commutator 30 with the segments 32a to 32j and the slots 33a to 33j can once again correspond to the commutator of the preceding preferred embodiments. By contrast with the preceding preferred embodiments, however, the second brush 62 preferably has the same width as the first brush 61, which corresponds to the width of one segment 32a to 32j plus one slot width.

The brush width b (shown in FIG. 5) is selected for each brush so that a symmetrical switching change of the same length is produced.

Arranging the first brush 61 and second brush 62 at a right angle to each other produces no significant difference from (a) of FIG. 3a in (a) of FIG. 4. The first brush 61 is preferably in contact with the segment 32a while the second brush 62 is in contact with the two segments 32c and 32d. This situation only lasts for a short time or a short angular rotation until the commutator 30 has rotated by one slot width such that the first brush 61 will also come into contact with the segment 32b. The first brush 61 and the second brush 62 are thus in electrical contact with a total of four segments as shown in (b) of FIG. 4. This situation also lasts for a further rotation. The contact with four segments thus lasts for a significantly longer time or a significantly longer rotation angle than the contact with three segments. As shown in (c) of FIG. 4, after a further rotation, the segment 32c leaves contact with the second brush 62, which is then only in contact with the segment 32d while the first brush 61 is still in contact with the segments 32a and 32b so that a total of three of the segments are in contact with a brush 61, 62. This state, however, also only lasts for one slot width until the segment 32e also comes into contact with the second brush 62 in addition to the segment 32d, as shown in (d) of FIG. 4. Since the first brush 61 is still in contact with the segments 32a and 32b, in this case, a total of four segments 32a, 32b, 32d, 32e are once again in contact with the brushes 61, 62 for a longer time period and a greater rotation angle. The switching change from 3 to 4 lamellae repeats and each 3-contact, or 4-contact period has the same duration respectively. In the preferred embodiment in FIG. 4 as well, the terms "short" and "long" must be understood as relative to each other and their absolute values are dependent on the rotation speed. In a commutator with 10 segments, the term "short" can preferably correspond to approximately 5.3°, for example, which corresponds to the difference between (a) and (b) of FIG. 4.

This arrangement also makes it advantageously possible to operate the electric motor as an asynchronous counter and thus preferably makes it possible to detect the movement and positioning of the electric motor. In the preferred embodiment shown in FIG. 4, the brush widths are preferably selected so that a symmetrical switching sequence is produced. In comparison to the preferred embodiment in FIG. 3, this achieves a doubled frequency with a lower current magnitude (2 main signals), which has a negative impact on sensitivity, but which preferably produces a symmetrical pulse. In order to increase the sensitivity of the current ripple, an asymmetrical magnetization is preferably adopted (see FIG. 7), which will be described later.

Figure 5:
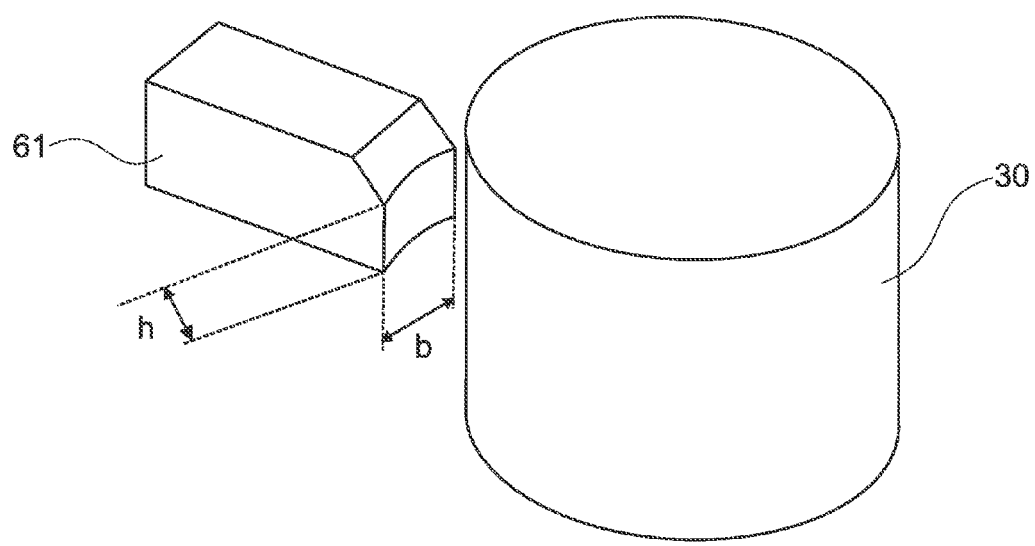
FIG. 5 shows an example of a brush in relation to the commutator according to a preferred embodiment of the present invention.

FIG. 5 shows how the brushes can be oriented and provided in relation to the commutator 30. In order to make such a connection, it should be ensured that the brush 61 reliably rests against the commutator 30 across its entire contact surface, including height h and width b, so that the above-mentioned function can be reliably ensured. In this case, it is advantageous if the brush radius of the brush surface is preferably equal or about equal to the commutator radius and the outer radius of the segments or, if need be, the brush radius of the brush surface may alternatively be slightly greater than the commutator radius and the outer radius of the segments. In addition, the brushes preferably include a thrust region that is of an appropriate size to prevent vibration of the brush and the support with regard to this segment width is ensured. This makes it possible to provide a guidance or quasi-guidance of the respective brush 61 across the commutator 30 and also makes it possible to avoid producing interference frequencies of vibrations of the brush 61.

Figure 6:
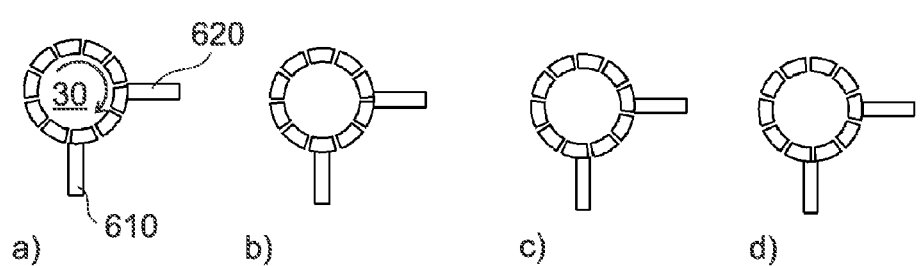
FIG. 6 shows a preferred embodiment of the generation of two main signals in the commutation of two to three segments in various positions (a)-(d) according to the present invention.
Figure 7:
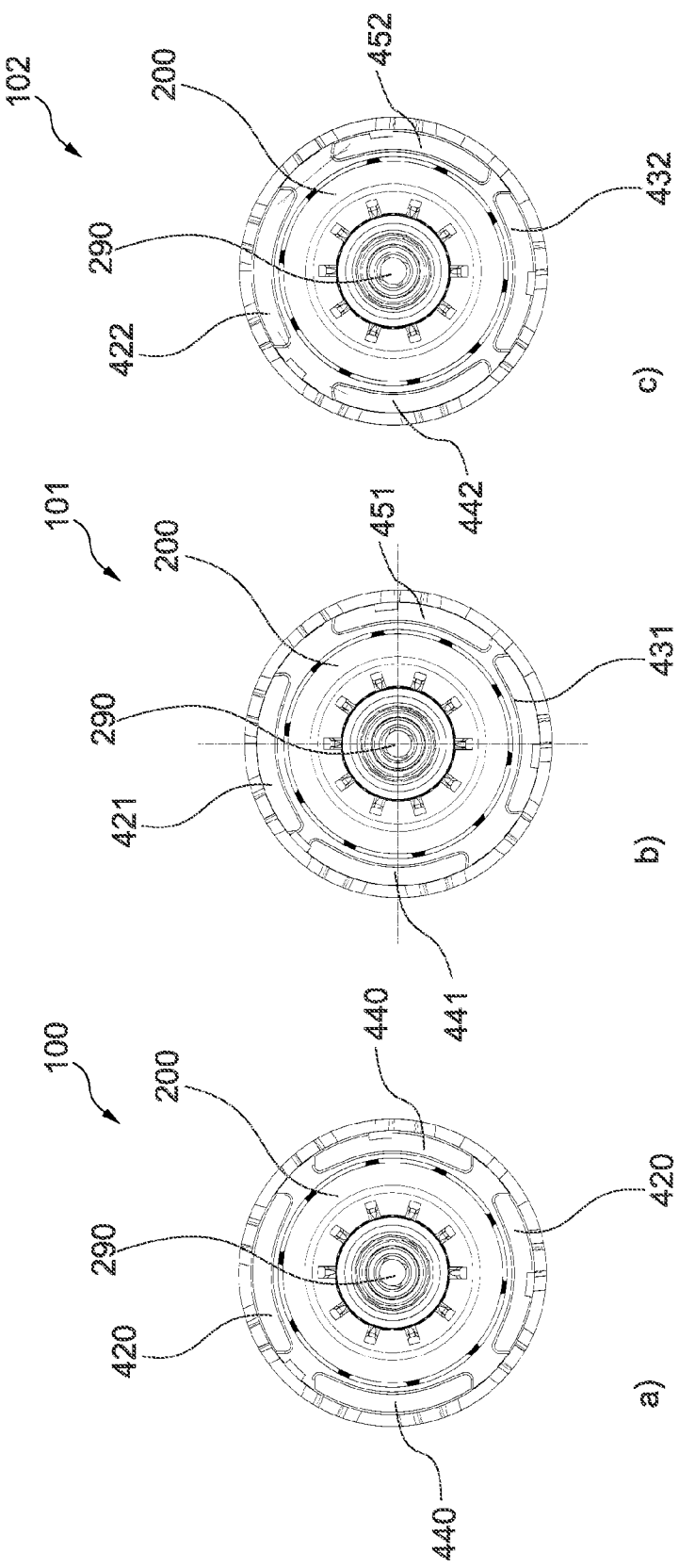
FIG. 7 shows arrangements (a)-(c) of a shape of magnet elements in electric motors according to preferred embodiments of the present invention.

FIGS. 6 and 7 show another preferred embodiment of the present invention in which an electric motor can be used as an asynchronous counter or "ripple counter". With a 90° arrangement of a total of four uniform brushes, and a total of 10 segments are used as illustrated in FIG. 6. It is advantageous from a noise generation standpoint that two brushes situated at a 90° angle from each other produce two different contact changes from two to three contacts, as shown in (a)-(d) of FIG. 6. This essentially produces two different or similar signals, a first signal corresponding to the commutation from contacting 2 to 3 segments and a second signal corresponding to the commutation from contacting 2 to 3 segments. In this case, the first and second signal cannot be differentiated from each other. Alternatively or in addition to the above-described asymmetrical contacting arrangement times, this preferred embodiment of the present invention includes the damping or suppressing of the first or second signal in order to make it possible to be distinguished from the other signal, by preferably using, for example, the asymmetric arranged magnetization which will be described below.

Instead of the arrangement of four stator magnets or pole shoes 420, 420, 440, 440 at an angle of 90°, as shown in FIG. 1 and also in (a) of FIG. 7, the stator magnets can also be arranged asymmetrically or can have an at least partially asymmetrical form. Symmetric magnets are shown in FIG. 1 and the motor 100 shown in (a) of FIG. 7 and asymmetrical arrangements are shown, for example, in the motors 101 and 102 in (b) and (c) of FIG. 7 which depict alternative preferred embodiments of the present invention. The stator magnets 421, 422, 431, 432, 441, 442, 451, 452 are preferably arranged such that two of the respective coil windings which correspond to only one of the first and second signals will not lie in the magnetic field of the stator magnets 421, 422, 431, 432, 441, 442, 451, 452 (or such that the two of the respective coil windings will lie in magnetic fields that have at least been reduced). As a result of this arrangement, either the first or the second signal can preferably be weakened or entirely suppressed, which makes only one peak that will be detected when the motor rotates for an angle between two adjacent segments.

As shown in (b) of FIG. 7, it is possible for the stator magnets to be respectively provided in pairs 421, 431 and 441, 451 arranged symmetrically opposite each other preferably at an angle of about 180°. The two pairs, however, are not arranged in the standard way at angle of 90° to one another, but are instead offset significantly from such an arrangement, for example at an angle of about 70° to about 85°.

As shown in (c) of FIG. 7, it is also possible for the stator magnets 422, 432, 442, 452 to be provided at an angle other than 90° relative to one another. Preferably, an angle of approximately 100° or more, for example, can be provided between a first stator magnet 422 and the adjacent stator magnets 452 and/or 442. The corresponding angle between the magnets 452 or 442 and the fourth stator magnet 432 is then correspondingly smaller, and in the preferred embodiment depicted, is preferably approximately 80°, for example. Accordingly, the second peak will emerge with the first peak to define a peak in which the amplitude and width are big enough to be detected.

Figure 8:
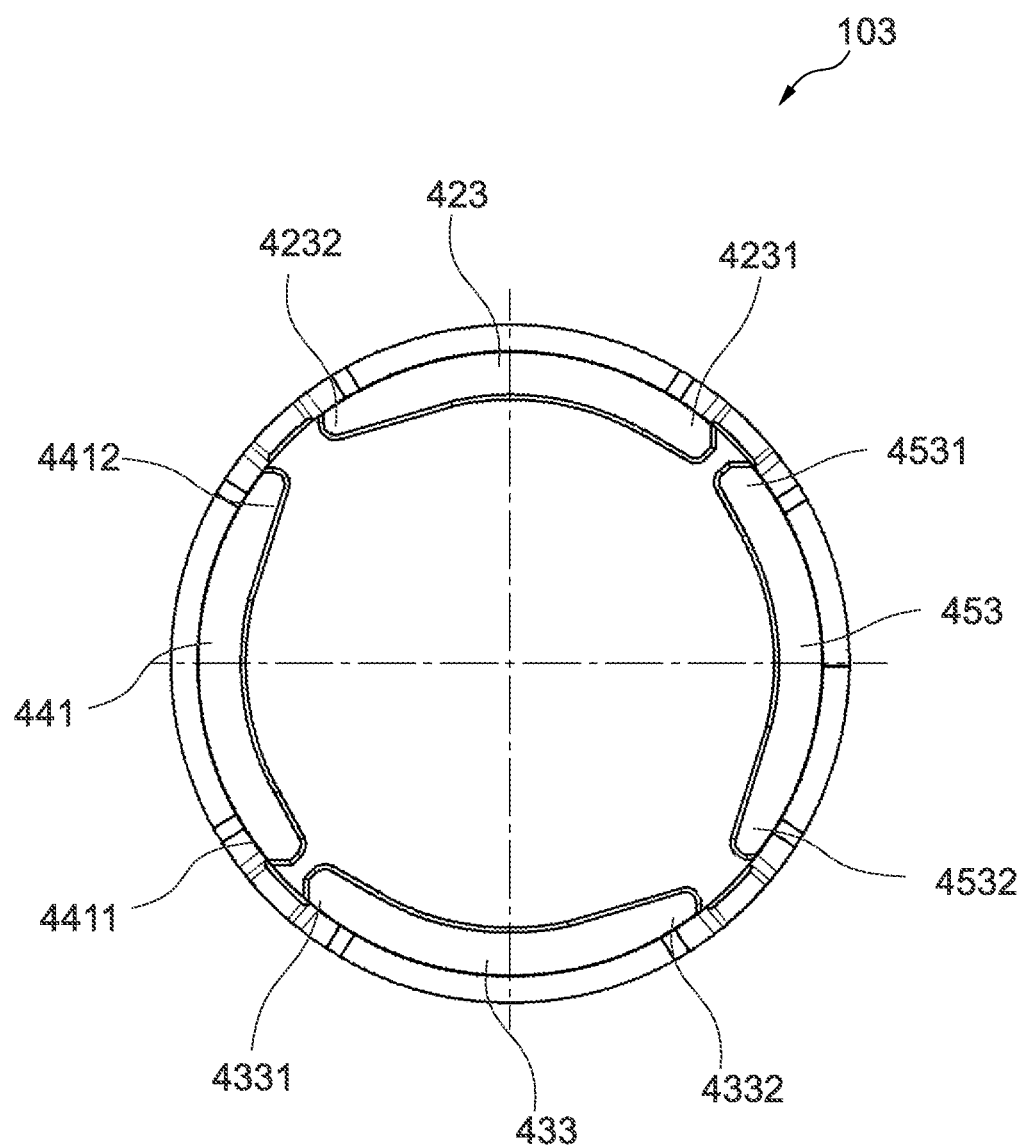
FIG. 8 shows an arrangement and a shape of magnet elements in an electric motor according to a preferred embodiment of the present invention.

Alternatively or in addition to the asymmetrical arrangement of stator magnets, as described in connection with (b) and (c) of FIG. 7, it is also possible to provide an asymmetrical shape of the stator magnets, as shown in the motor 103 of FIG. 8. For the sake of better comprehension, only the stator is shown in FIG. 8. All of the elements relating to the rotor and the brushes have been omitted and can correspond to the preferred embodiments described above. As in (b) of FIG. 7, the stator magnets 423, 433 and 441, 453 are respectively arranged opposite each other in pairs. The stator magnet pair 423, 433 is preferably situated asymmetrically relative to the second stator magnet pair 441, 453. In addition to this, and in contrast to the preferred embodiment shown in (b) of FIG. 7, the individual stator magnets 423, 433, 441, and 453 are preferably not shaped symmetrically, but instead have an asymmetrical shape to thereby achieve an asymmetrical field pattern of the stator magnetic field. In the preferred embodiment shown in FIG. 8, each of the stator magnets 423, 433, 441, and 453 preferably has one end with a normal thickness 4231, 4331, 4411, or 4531 and a flattened end 4232, 4332, 4412, or 4532. The flattened ends 4232, 4332, 4412, and 4532 are respectively arranged in pairs with one another in order to increase the asymmetry of the magnetic field. In addition, the flattened ends 4232, 4332, 4412, and 4532 are preferably positioned so that the distance between the respective flattened ends 4232, 4332, 4412, and 4532 is greater than the distance between the ends of normal thickness 4231, 4331, 4411, and 4531. This combines the advantages of the asymmetrical shape with the asymmetrical arrangement. When the asymmetric magnetization is applied to the arrangement of brushes and commutator in FIG. 6, two peaks will be produced in the current ripple curve when the motor rotates an angle equal to the angle between two segments (which is preferably about 36° in this preferred embodiment), but the amplitude and/or width of the two peaks are different. And because the small peak is hidden under the big peak due to the asymmetric magnetization, only the big peak is preferably detected while the rotor rotates for 36°. And the peak has sufficient amplitude and width to be simply detected.

While the term "stator magnet" is used in the description of the preferred embodiments, the magnetic field can also be produced by, for example, pole shoes or other arrangements known to those having skill in the art. Depending on the motor type, the stator magnet can be, for example, a permanent magnet or an electromagnet.

Whereas a few preferred embodiments of the present invention have been described above, it is possible for one having skill in the art to produce other modifications or combinations of the preferred embodiments mentioned above. One having skill in the art will also should recognize that instead of changing the width of the brushes, it is also possible to change the width of the segments of the commutator or to provide a different gap width between the segments.

One having skill in the art will also recognize that the number of segments can be selected in accordance with the requirements and need not be limited to the depicted example of ten segments. Furthermore, a similar effect can be achieved by another number of brushes.

The term "asymmetrical" used herein to describe any arrangement that is not symmetrical.

An electric motor according to a preferred embodiment of the present invention can also include devices that make it possible to read and evaluate the corresponding electrical contacts. To this end, it is possible in particular to detect voltages or voltage changes in the excitation circuits.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric motor comprising:
   a first brush and a second brush; and
   a commutator arranged to rotate with a rotor of the electric motor; wherein
   the first brush and the second brush are stationary relative to the commutator;
   the commutator includes at least one cylindrical section with a circumferential surface on which a plurality of segments are arranged, with insulating sections interposed between the plurality of segments;
   a total number of the plurality of segments is not the multiple of a total number of the poles of the electric motor;
   the first brush has a first width which is arranged to cover a first section of the circumferential surface and the second brush has a second width arranged to cover a second section of the circumferential surface; and
   the first width and the second width are different from each other.

2. The electric motor according to claim 1, wherein the total number of poles of the electric motor is four and a total number of brushes of the electric motor is two or four.

3. The electric motor according to claim 1, wherein the plurality of segments, the first brush, and the second brush are arranged relative to one another so that a brush angle defined between the first brush and the second brush is both greater than a first segment angle that is defined by a first sequence of the segments and is also less than a second segment angle that is defined by the first sequence of segments plus an additional segment adjoining the first sequence of segments.

4. The electric motor according to claim 1, wherein the plurality of segments, the first brush, and the second brush are arranged relative to one another so that a brush angle defined between the first brush and the second brush is not equal to a segment angle that is defined by any combination of two of the segments.

5. The electric motor according to claim 1, wherein the plurality of the segments, the first brush, and the second brush are arranged such that at any time of a full rotation of the rotor, a total of either two or three of the segments are in electrical contact with the first brush and the second brush.

6. The electric motor according to claim 1, wherein the plurality of segments, the first brush, and the second brush are arranged relative to one another so that at any time of a full rotation of the rotor, a total of either three or four of the segments are in electrical contact with the first brush and second brush.

7. The electric motor according to claim 1, wherein the plurality of segments are of an unequal size and/or are spaced unequal distances apart from one another.

8. The electric motor according to claim 1, wherein the first brush and the second brush are arranged at an angle of less than about 90° relative to each other around the commutator.

9. The electric motor according to claim 1, wherein the motor includes four poles and 10 segments, and an angle between the first brush and the second brush is about 86°.

10. An electric motor comprising:
    a first brush and a second brush arranged in a stator; and
    a commutator arranged to rotate with a rotor of the electric motor; wherein
    the first brush and the second brush are stationary relative to the commutator;
    the commutator includes at least one cylindrical section with a circumferential surface on which a plurality of segments are arranged, with insulating sections interposed between the plurality of segments;
    a total number of the plurality of segments is not the multiple of a total number of the poles of the electric motor; and
    the stator has an irregular magnetization.

11. The electric motor according to claim 10, wherein the plurality of the segments, the first brush, and the second brush are arranged such that at any time of a full rotation of the rotor, a total of either two or three of the segments are in electrical contact with the first brush and the second brush.

12. The electric motor according to claim 10, wherein a plurality of magnets are arranged unevenly around the rotor.

13. The electric motor according to claim 10, wherein a plurality of magnets are arranged around the rotor, and at least one of the plurality of magnets has an asymmetric shape.

14. The electric motor according to claim 10, wherein a plurality of magnets are arranged around the rotor, and a magnetic field of at least one of the plurality of magnets is arranged asymmetrically.

15. The electric motor according to claim 10, wherein
    the electric motor includes a stator and the stator includes at least one first magnet element and at least one second magnet element; and
    the at least one first magnet element and the at least one second magnet element include at least one of a permanent magnet and a coil.

16. The electric motor according to claim 10, wherein the electric motor includes a stator and the stator includes four magnet elements that are respectively arranged in pairs at an angle of about 180° around the rotation axis.

17. The electric motor according to claim 10, wherein the electric motor includes a stator and the stator includes four magnet elements which are respectively arranged in pairs at an angle of about 180° around the rotation axis and each of the four magnet elements have an asymmetrical shape.

18. The electric motor according to claim 17, wherein the stator includes the first brush and the second brush, and an angle between the first brush and the second brush is about 90°.

19. The electric motor according to claim 10, wherein the total number of poles of the electric motor is four and a total number of brushes of the electric motor is two or four, and the commutator includes ten segments.

20. The electric motor according to claim 19, wherein
    the electric motor includes a stator and the stator includes four magnet elements; and a first magnet element and a second magnet element of the four magnet elements are arranged at an angle of approximately 100° or greater relative to each other around the rotation axis.

21. An asynchronous counter, which includes the electric motor of claim 10 and which is arranged to count contact times produced at the first brush and the second brush with the commutator.

22. A method for determining a position or rotation direction of the electric motor according to claim 10, the method comprising a step of measuring a sequence and/or duration of a number of segments with which the first brush and the second brush are in electrical contact.

23. The method as recited in claim 22, further comprising a step of making a determination as to whether the motor is rotating and in which position the motor is situated based on the sequence and/or duration of the number of segments.

24. The electric motor according to claim 10, further comprising a ripple current curve which includes only one detectable peak generated when the motor rotates at an angle equal to an angle between two adjacent segments.

25. The electric motor according to claim 10, wherein the first brush has a first width which is arranged to cover a first section of the circumferential surface and the second brush has a second width arranged to cover a second section of the circumferential surface, and the first width and the second width are different from each other.

\* \* \* \* \*